US012694399B2

(12) United States Patent
Sithamraju

(10) Patent No.: US 12,694,399 B2
(45) Date of Patent: Jul. 28, 2026

(54) DEVICE AND METHOD FOR VALIDATION AND PROCESSING OF A TRANSACTION SLIP IMAGE

(71) Applicant: Glory Ltd., Himeji (JP)

(72) Inventor: Giridhar Sithamraju, Irvine, CA (US)

(73) Assignee: GLORY LTD., Himeji (JP)

( * ) Notice: Subject to any disclaimer, the term of this patent is extended or adjusted under 35 U.S.C. 154(b) by 3 days.

(21) Appl. No.: 18/125,756

(22) Filed: Mar. 24, 2023

(65) Prior Publication Data

US 2024/0257123 A1     Aug. 1, 2024

Related U.S. Application Data

(60) Provisional application No. 63/441,265, filed on Jan. 26, 2023.

(51) Int. Cl.
*G06Q 20/40*          (2012.01)
*G06Q 20/04*          (2012.01)

(52) U.S. Cl.
CPC ......... *G06Q 20/40* (2013.01); *G06Q 20/0425* (2013.01)

(58) Field of Classification Search
CPC ............................ G06Q 20/40; G06Q 20/0425
See application file for complete search history.

(56) References Cited

U.S. PATENT DOCUMENTS

| | | | | |
|---|---|---|---|---|
| 7,386,511 B2 * | 6/2008 | Buchanan | ............ | G06Q 20/102 |
| | | | | 705/16 |
| 7,792,753 B1 * | 9/2010 | Slater | ................... | G06Q 20/042 |
| | | | | 705/45 |
| 8,162,125 B1 * | 4/2012 | Csulits | ................... | G07D 11/50 |
| | | | | 194/207 |
| 8,417,629 B1 * | 4/2013 | Hildebrand | ............ | G06Q 40/00 |
| | | | | 705/35 |
| 9,460,588 B1 * | 10/2016 | Kang | ................... | G06V 30/412 |
| 10,504,077 B1 * | 12/2019 | Hu | ............................ | G07F 9/06 |
| 10,853,800 B1 * | 12/2020 | Meyer | ............. | G06Q 20/38215 |
| 2004/0230508 A1 * | 11/2004 | Minnis, Jr. | ............. | G06Q 10/10 |
| | | | | 705/35 |
| 2005/0071283 A1 * | 3/2005 | Randle | ................... | G06Q 20/12 |
| | | | | 705/75 |
| 2006/0112013 A1 * | 5/2006 | Maloney | ................ | G06Q 40/00 |
| | | | | 705/16 |
| 2011/0016046 A1 * | 1/2011 | Lindstrom | ............ | G07F 19/202 |
| | | | | 709/206 |
| 2012/0054099 A1 * | 3/2012 | Fox | .................... | G06Q 20/1085 |
| | | | | 705/43 |
| 2013/0173930 A1 * | 7/2013 | Obligacion | ......... | G06F 21/6218 |
| | | | | 713/193 |
| 2014/0233835 A1 * | 8/2014 | Sandoz | ................ | H04N 1/4177 |
| | | | | 382/137 |
| 2015/0356545 A1 * | 12/2015 | Marcuccilli | .......... | G06V 30/127 |
| | | | | 705/40 |

* cited by examiner

*Primary Examiner* — Matthew S Gart
*Assistant Examiner* — William D Newlon
(74) *Attorney, Agent, or Firm* — XSENSUS LLP

(57)          ABSTRACT

A financial transaction validation system comprises processing circuitry configured to: receive transaction information, relating to a transaction, and a validation slip image corresponding to the transaction information; generate a validation string corresponding to the validation slip image; merge the validation string with the validation slip image to generate a modified slip image; and store, in a database, the modified slip image in association with a transaction identifier corresponding to the transaction.

17 Claims, 5 Drawing Sheets

DEVICE AND METHOD FOR VALIDATION AND PROCESSING OF A TRANSACTION SLIP IMAGE

CROSS-REFERENCE TO RELATED APPLICATION

This application claims priority under 35 U.S.C. § 119(e) from U.S. Provisional Patent Application No. 63/441,265 filed Jan. 26, 2023. The disclosure of that provisional patent application is incorporated herein by reference in its entirety.

TECHNICAL FIELD

The present disclosure relates generally to image processing and more particularly to digital image processing for carrying out financial transactions and for transaction bookkeeping.

BACKGROUND

In financial sectors, and particularly in the banking sector, various financial transactions demand in-person customer service at a "brick-and-mortar" financial institution. No example of such a financial transaction is perhaps better known than the in-person cash deposit at a depositor's bank. As a transaction, a cash deposit generally includes a physical transfer of the cash from the customer's hands to those of a bank teller, for example, who may subsequently count the cash for validation.

SUMMARY

In an exemplary implementation of the present disclosure, a financial transaction validation system, comprises processing circuitry configured to: receive transaction information, relating to a transaction, and a validation slip image corresponding to the transaction information; generate a validation string corresponding to the validation slip image; merge the validation string with the validation slip image to generate a modified slip image; and store, in a database, the modified slip image in association with a transaction identifier corresponding to the transaction.

DETAILED DESCRIPTION

The use of paper slips provide a needed means to audit financial transactions. However, the inventor of the present disclosure has recognized that use of such paper slips is unwieldy. Validation information must be displayed on the slip, which has traditionally required the use of a slip printer. While slip printers can be ordered at rapid printing speeds, slip printing requires additional operations such as loading and unloading the slip on and off the printer. Moreover, once printed, the paper slip must be stored, either in paper form or as an image in memory, each of these options requiring additional external operations to accomplish. The inventor has developed the technologies of the present disclosure to address the identified issues with paper slips, by merging images of paper deposit slips with dynamically generated validation strings and storing the images in a secure database to reduce deposit processing time, eliminate the need for paper slip(s), optimize banking operations, eliminate any need for validation printers and eliminate waste.

In the present disclosure, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

Figure 1:
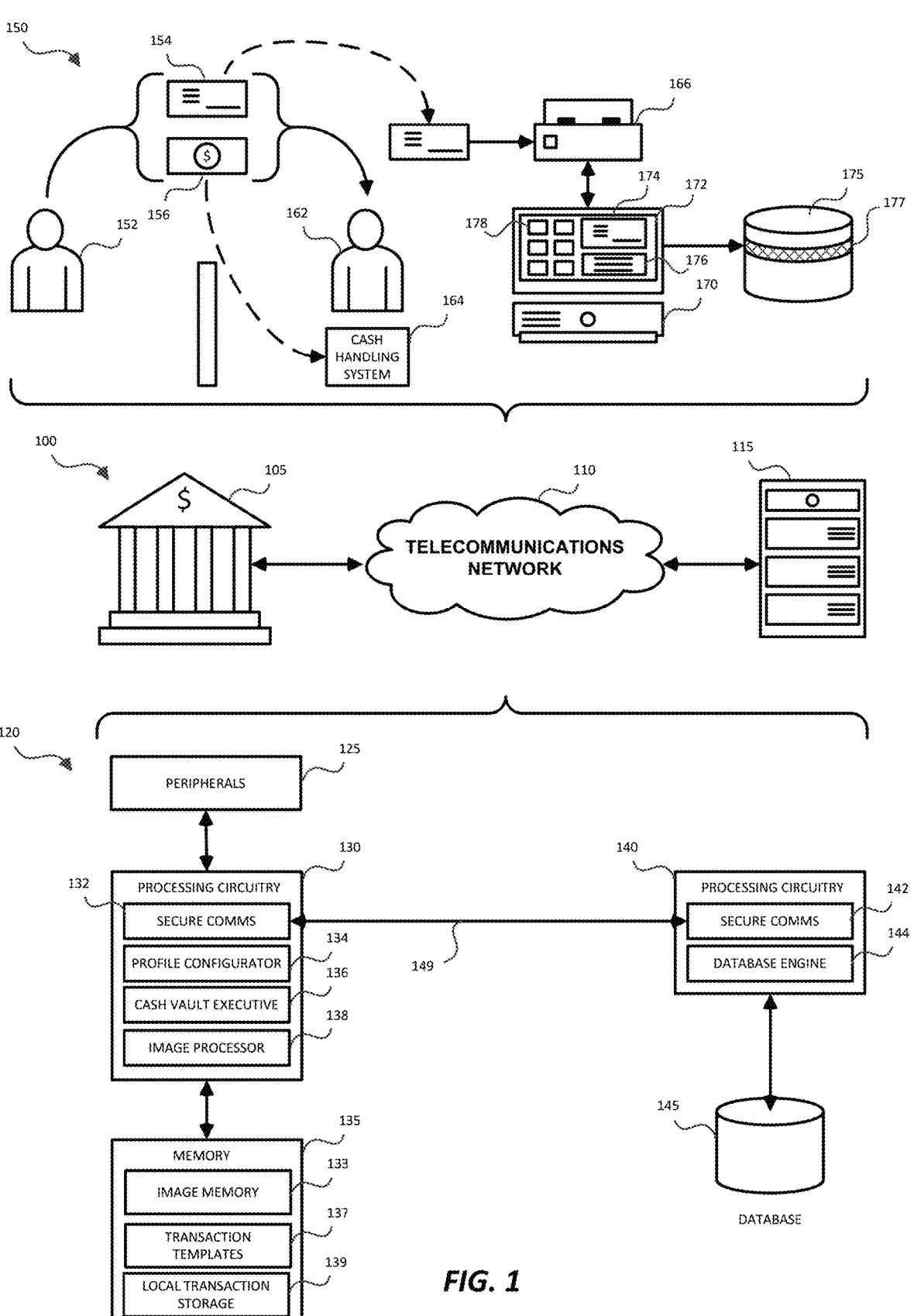
FIG. 1 is an illustration of an exemplary financial transaction system according to the present disclosure.

FIG. 1 is an illustration of an exemplary financial transaction system according to the present disclosure. The figure is divided into three (3) panels of which the center panel depicts an exemplary financial institution 100, the lower panel depicts an exemplary transaction validation system 120 that may be implemented on computational and data processing resources of financial institution 100 in an embodiment of the present disclosure, and the upper panel graphically depicts a transaction validation process 150. As used herein, the term "validation" is intended to refer to an attestation, printing timestamp and printing specific transaction details, in certain embodiments, is generally made by a bank employee facilitating the transaction through actuating a user control on, for example, user interface 172, that commits the transaction and its corresponding validation information, to which the bank employee is affirming as correct, into persistent bank records.

As illustrated in the figure, financial institution 100 may comprise a building 105 in which the business of financial institution 100 is conducted and in which local computational and data processing resources reside. Additionally, financial institution 100 may include remote computational and data processing resources thereof, such as exemplary server 115, that may be accessed from building 105, among other places, through a telecommunications network 110. As will be further discussed below, local resources at building 105 and remote resources at server 115 may communicate over secure communication channels in accordance with banking privacy laws, regulations and policies. Building 105 might be a bank, but is not limited to such and may be another type of establishment. Further, a bank may outsource a task to a facility different from the bank, in that case an outsourced facility might do the task. Building 105 could be not only a bank but also the outsourced facility.

In an exemplary implementation, cash handling system 164 and user terminal 170 may be located at building 105 of financial institution 100. Bank customer 152 may initiate a transaction which may be handled by bank teller 162. Cash handling system 164 and/or user terminal 170 may include, be components of, or be implemented by transaction validation system 120. Once the transaction has begun or is completed, transaction validation process 150 may be initiated. Transaction validation process is performed by transaction validation system 120.

Transaction validation system 120 may include processing circuitry 130 and memory (also referred to as memory circuitry) 135 serving as the local computational and data processing resources of financial institution 100 and processing circuitry 140 and memory 145 serving as the remote computational and data processing resources of financial institution 100. Aspects of the present disclosure concept can be practiced agnostically as to specific processor and/or memory circuitry to the extent that such circuitry is indeed constructed or otherwise configured to embody the present disclosure. As depicted in FIG. 1, for example, memory 145 may include persistent storage (as may memory 135) in which a database is established. For purposes of simplification and understanding of the descriptions herein, memory 145 may be referred to herein as database 145 where distinction between the two is unnecessary. For similar reasons, processing circuitry X and memory circuitry Y may be referred to simply as processor X and memory Y with the understanding that realizations of physical circuits capable of switching electrical current underlie those terms. It is to be further understood that functional components attributed to processing circuitry herein (as in, for example, "processor X may implement (or include) Z," where Z is such a functional component) are implemented in hardware and/or hardware executing processor instructions (software) even where explanations herein omit explicit recitations of the underlying physical processes. Such software may be stored in memory circuitry, but depiction of such storage is omitted for conciseness.

As illustrated in FIG. 1, processing circuitry 130 and processing circuitry 140 may implement secure communication adapters 132 and 142, respectively, by which private communication between financial institution 105 and remote entities such as server 115 may be conducted over a secure communication channel 149. Again, aspects of the present disclosure can be practiced agnostically as to specific private, secure communication techniques. In the financial transaction context exemplified herein, the level of communication security is governed by an external body such as a government or regulating entity. Nevertheless, aspects of the present disclosure can be embodied using arbitrary levels of communication security. It is to be understood that communication adapters 132 and 134 may be realized in processing circuitry that is physically separated from a central processing unit, as the term is commonly used among technicians, while remaining in electrical communication therewith for signaling and data transfer, for example.

Processing circuitry 130 may be constructed or otherwise configured to implement exemplary profile configurator 134 by which various transaction templates (stored in transaction templates memory 137) can be created. This feature of the illustrated embodiment is exemplified below with reference to FIG. 2. Cash vault executive 136 may implement functionality that automates certain cash handling operations, such as deposit, withdraw, inventory transfer, to complete a transaction following its validation, for example. Modern banking, especially for large banking corporations, may employ more sophisticated or more functionally rich cash handling equipment and processes; exemplary cash vault executive 136 is intended to represent the necessary adaptations to such equipment. Cash vault executive 136 may implement validation processes themselves, such as those described below. Additionally, cash vault executive 136 may implement signaling and data transfer protocols for interacting with peripherals 125, such as scanners, cash counters/sorters, etc., involved in the performance of the transaction.

Processing circuitry 130 may implement an image processor 138 constructed or otherwise configured to input/output an image, render images into image memory 133, manipulate basic image units (e.g., pixels, vectors, etc.), render graphical elements including alphanumeric characters onto images in image memory 133, and so on. Exemplary image processing operations and storage of resulting images in local transaction storage 139 of memory 135 are explained below.

The images and data in local transaction storage 139, such as that exemplified herein, may be synched or otherwise uploaded into database 145 through exemplary database engine 144. Exemplary database features that may be embodied are provided below with reference to FIG. 4. A variety of database techniques may be implemented, although not all databases are outfitted for data entries that include both graphic and related computer-readable data, e.g., as demonstrated through examples below. However, skilled technicians will recognize techniques by which limitations in database technology being used can be overcome to embody technologies of the present disclosure.

Exemplary transaction validation process 150 may include a personal transfer of cash 156 from a bank customer 152 and a bank teller 162. A bank teller 162 might be a staff working for a bank, but not limited. When a bank might outsource the validation task to a facility different from the bank, in that case a staff in the facility might do the validation task. A bank teller 162 could be not only a bank staff but also a staff working from the outsourced facility. It is to be assumed that the transaction being performed in transaction validation process 150 is a cash deposit into the bank customer's 152 account; other financials transaction are discussed below. As such, bank customer 152 may provide a deposit slip 154 with cash 156 that may indicate such information as, for example, a printed account information as well as a handwritten amount of cash being deposited. It is to be understood that cash 156 may include other fungible financial instruments in the same deposit, such as checks, and a handwritten listing of those instruments may be included on deposit slip 154.

Bank teller 162 may have access to a user terminal 170 by which aspects of transaction validation are implemented by, among other things, processing circuitry 130. For example, user terminal 170 may realize a user interface 172 having user interface controls, representatively illustrated at user interface control 178, by which bank teller 162 is afforded some control over the transaction and its validation. User interface 172 may also provide visual information by which the transaction may be monitored by bank teller 162, such as, among other things, a graphical representation 174 of deposit slip 154 and/or validation information 176. In another exemplary implementation, user terminal 170 may be an automated teller machine (ATM) operated by a customer.

In the example of FIG. 1, bank teller 162 may scan deposit slip 154 via a slip scanner 166, which may be implemented in a wide range of optical scanning devices. In certain implementations, slip scanner 166 may be constructed or otherwise configured for media having a specific aspect ratio, e.g., one that is sized specifically for validation slips, checks, and other common banking papers. However, exemplary slip scanner 166 is intended to represent document handling, reproduction and management systems of any scale. The resulting output of slip scanner 166 may be image data that may be stored in image memory 133, which may be a dedicated area of memory 135 that is constructed or otherwise configured particularly for memory-based image manipulation techniques.

In the cash deposit example, a customer provides its own deposit slip 154 whose scanned image in image memory 133 may serve as a transaction slip image. As used herein, the term "transaction slip image" refers to an image in memory of a banking slip for a selected transaction type. It may contain no information regarding the particulars of individual transactions (e.g., the transaction amount, date and time of the transaction, account numbers involved in the transaction, transaction IDs, etc.) or whether the transaction has been validated. For purposes of the present discussion, a transaction slip image need only be appropriate to the type of transaction at hand without regard the particulars of that transaction. On the other hand, the term "validation slip image" is intended to refer to a transaction slip image that has the aforementioned particulars rendered thereon, such as by processes described herein.

When deposit slip 154 is rendered into image memory 133 as a transaction slip image, transaction information may also be generated, some of which may be entered by bank teller 162 through user interface 172, e.g., the cash amount being deposited, a target account number, etc., while other transaction information may be generated by automated processes, such as generating a transaction ID. In other implementations, the transaction information may be generated through an automated character recognition process by processing the deposit slip 154 or the transaction slip image.

When the transaction information has been verified by bank teller 162, it is referred to herein as "validation information" or, analogously, "validation data," and may be graphically rendered onto the transaction slip image to form a validation slip image. Bank teller 162 may commit the transaction to banking records by actuation of a user control 178, an action that may compel messaging with cash handling system 164 to permit access, however indirectly, to the bank's vault. Cash handling system 164 and user terminal 170 may be a same device or separate devices, and cash handling system 164 and user terminal 170 may be integrated with or implemented by the transaction validation system 120. Depending on its implementation, cash handling system 164 may open a cash drawer, dispense or accept cash through automated delivery slots or apertures, or otherwise permit access to cash for deposits, withdrawals, transfers, etc. Additionally, committing the transaction may also compel the storage of the validation slip image in persistent memory 175, such as at a location on a database 177.

Figure 2:
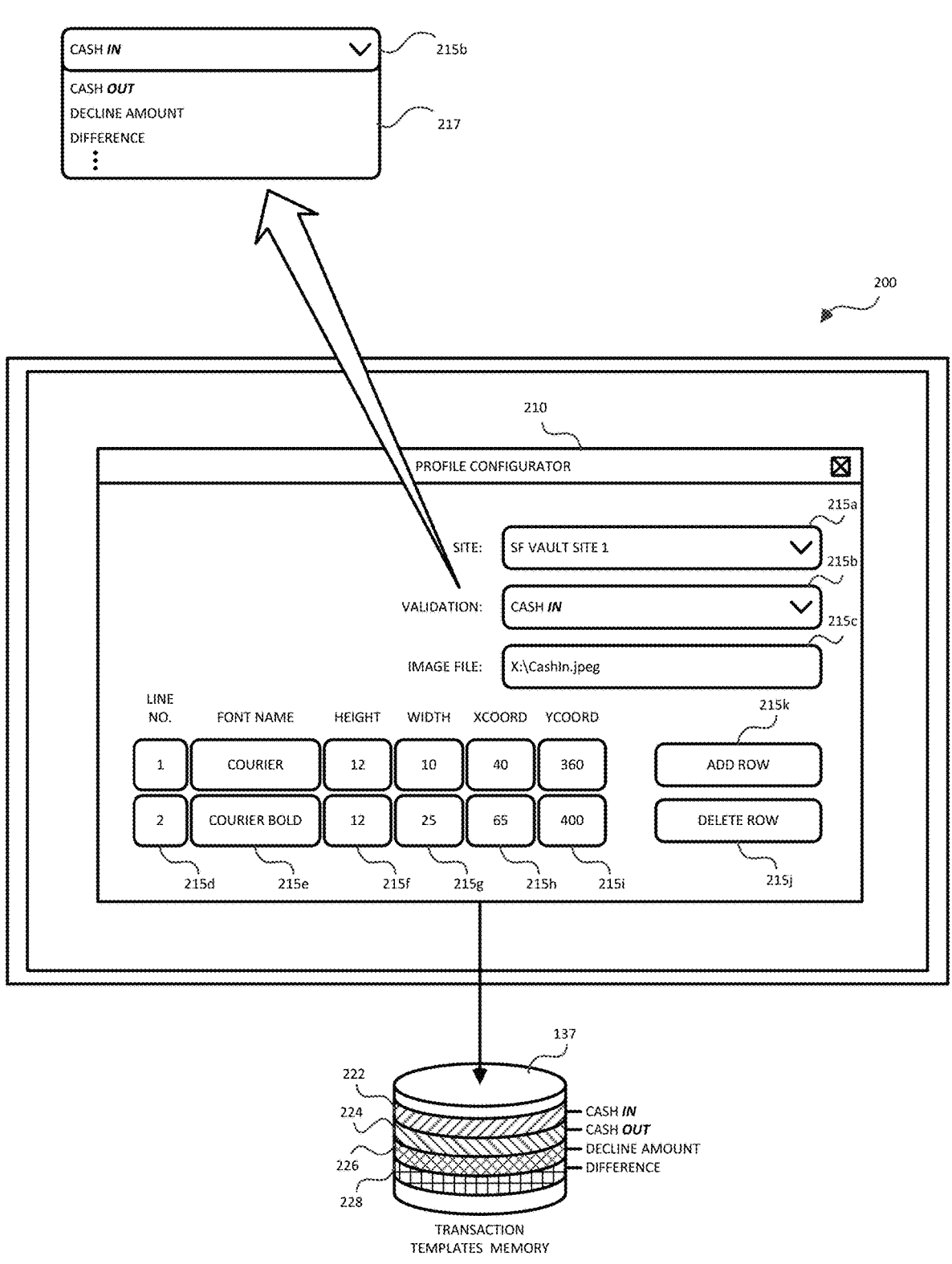
FIG. 2 is an illustration of an exemplary user interface component by which validation profiles may be created in embodiments of the present disclosure.

FIG. 2 is an illustration of an exemplary profile configurator interface 210 that may be presented on a user terminal 200 for interacting with profile configurator 134 to create validation profiles in embodiments of the present disclosure. As used herein, a "validation profile" is intended to refer to a data structure defining parameters, characteristics and graphical presentation of a validation slip image for a given transaction type. Accordingly, profile configurator interface 210 may implement a set of user controls 215a-215j, referred to herein as profile configurator controls 215a-215j or, collectively, profile configurator control(s) 215, by which validation profile data may entered, such as by an authorized bank employee. As illustrated in the figure, exemplary profile configurator controls 215 may include a site selection control 215a by which a bank site may be selected in multisite financial institutions, a transaction type selection control 215b by which the transaction type being configured may be selected, and a transaction slip image file entry control 215c in which a selected transaction slip image file may be selected. In certain embodiments, transaction slip image files may contain one or more graphical elements such as a bank logo, background images, such as might indicate the transaction type, graphically rendered text and so on.

In certain embodiments, validation information may be rendered on the transaction slip image retrieved in the corresponding transaction slip image file. As would be expected by banking technicians, such validation information may be specific to a selected transaction type. Accordingly, transaction type selection control 215b may implement a list 217 of transaction types, the content of which may vary by implementation. For purposes of description and not limitation, such a list may include exemplary transaction types of: cash in, indicating that cash is being added to the bank's vault through, for example, cash vault executive 136 and cash handling system 164; cash out, indicating that cash is being removed from the bank's vault; declared amount indicating the expected amount and difference indicating the difference between expected amount and actual verified amount.

User controls 215a-215j of profile configurator interface 210 may include those by which the placement and format of validation information are specified for its rendition on the transaction slip image specified in transaction slip image file entry control 215c. In the illustrated example, the validation information is rendered as lines of text or, more aptly, rendered as lines of graphical representations of alphanumeric characters, the placement of each of which may be specified through profile configurator interface 210. It is to be understood, however, that while embodiments of the present disclosure may be constructed or otherwise configured to include validation information other than alphanumeric data, the examples herein are confined to textual implementations for conceptual simplicity. Skilled technicians will recognize different ways of adding other graphical elements as validation information, but those ways can be achieved by the processes already described herein. That is, from a typical image processing point of view, rendering text as graphics and rendering graphics as graphics involves analogous, if not identical processes.

As depicted in FIG. 2, profile configurator control 210 may include user controls by which the typography may be formatted as lines of graphically rendered alphanumeric characters. To that end, a row addition control 215k may add fields for validation text line formatting for a row of text and a row deletion control 215j may remove fields for validation text line formatting. According to such adding and deleting of rows, validation text line formatting controls may include a line number control 215d by which one or more index values that distinguish lines of text may be entered. It is to be understood that a line number index does not necessarily reflect a position on a slip image, which may be controlled by X- and Y-coordinate entry fields 215h and 215i, respectively. Each validation text line, a typographic font may be identified in a font entry field 215e and the character dimensions may be identified through height and width entry fields 215f and 215g, respectively.

Image processor component 138 may be constructed or otherwise configured for, among other things, typography using the native font system of the operating system under which profile configurator 134 executes. Image processor component 138 may render alphanumeric validation data on a transaction slip image entirely in memory to thereby produce a validation slip image. A benefit of transaction validation according to the present disclosure is the elimination of the need for traditional slip printers and all of the activities associated therewith.

The data entered through profile configurator interface control 210 may be stored in a data structure, such as that described with reference to FIG. 3, serving as a template for day-to-day transactions as needed. For example, transaction templates memory 137 may include, among others, a cash in template 222, a cash out template 224, a declared amount template 226 and a difference template 228 that may be selected via a transaction type selection control implemented on, for example, user interface 172. It is to be understood that transaction types may vary from industry to industry and from institution to institution.

Figure 3:
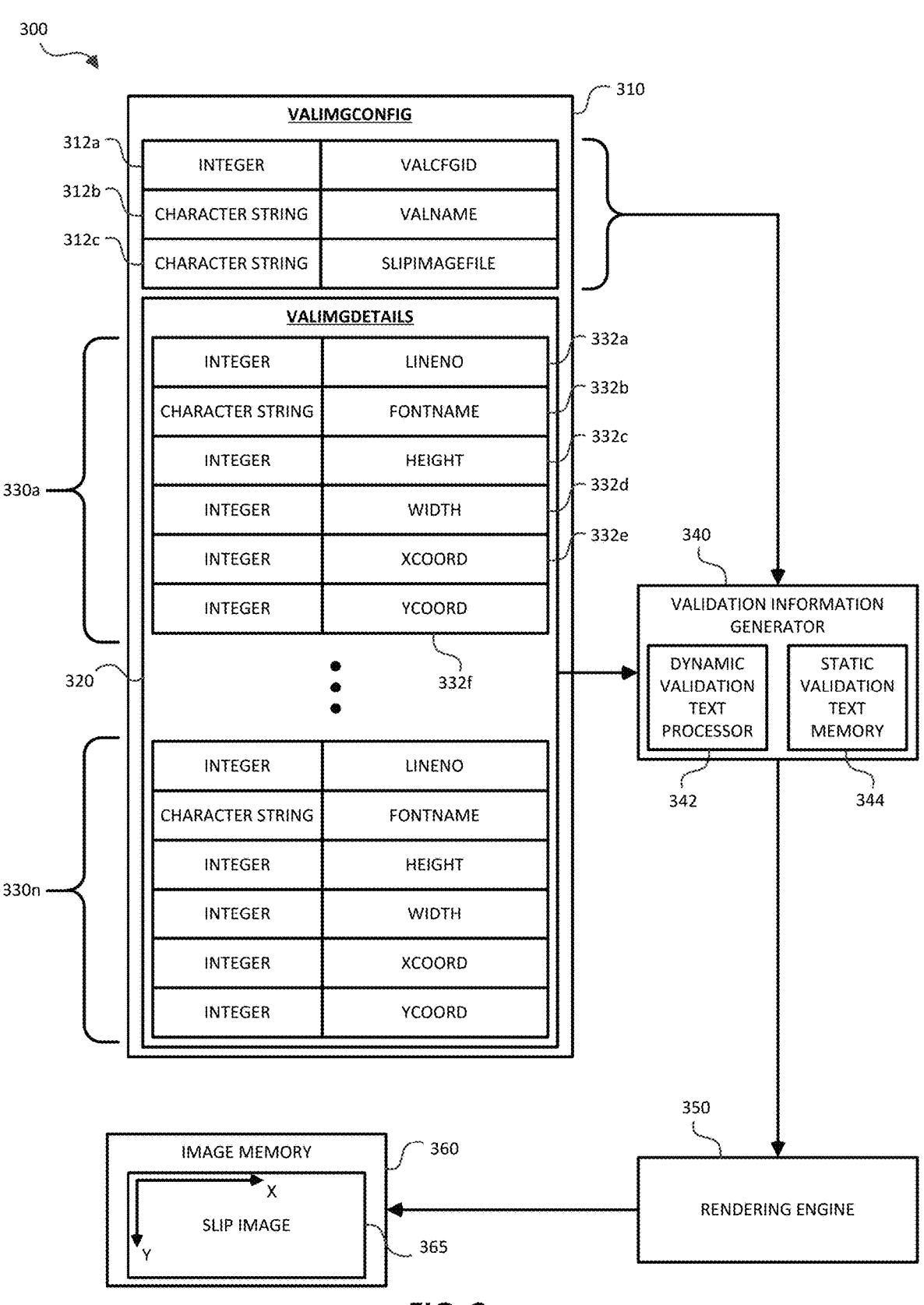
FIG. 3 is an illustration of exemplary transaction validation operations according to the present disclosure.

FIG. 3 is an illustration of exemplary transaction validation operations according to the present disclosure. The data entered through profile configurator interface control 210 may be stored in a validation information profile 310, which, as used herein, refers to a data structure, e.g., VALIMG-CONFIG, containing transaction type information and validation text line information, e.g., VALIMGDETAILS. As depicted in FIG. 3, validation information profile 310 may include an integer valued validation configuration ID 312*a* that indicates the transaction type, a character string validation configuration name 312*b* and a character string identifying the slip image file for the profile. Validation information profile 310 is included in, or is a component of validation information data structure 300.

Validation information profile 310 may include line data 330*a*-330*n*, representatively referred to herein as line data 330, in a validation image details data structure 320 for each line of validation information for the validation type. Such details may include an integer valued line number 332*a* containing the previously described line index, a character string font name 332*b* for the selected font, integer valued height and width 332*c* and 332*d* for the rendered validation text information line, and integer valued X- and Y-coordinates 332*e* and 332*f* defining the coordinates on slip image 365 for that particular line of text, as depicted in the figure.

As exemplified in FIG. 3, validation profile 310 may be provided to validation information generator 340 at which the validation data for a particular transaction is associated with the fields of validation information profile 310. Validation data may include dynamic information that includes variable information, such as time, date, transaction ID, etc. Accordingly, validation information generator 340 may include a dynamic validation text processor 342 by which the dynamic information is associated with corresponding fields of validation information profile 310 and static information text memory 344 in which the static data is associated with static information fields of validation profile 310. The associated information, e.g., validation information to be rendered and the information as to how the validation information is to be rendered, may be provided to rendering engine 350, which may be a component of image processor 138. Rendering engine 350 may implement techniques by which pixels and other basic image units are assigned different values or are otherwise modified. Such modifications may realize the rendering of validation information on slip image 365 in image memory 360, which may be a component of image memory 133.

Figure 4:
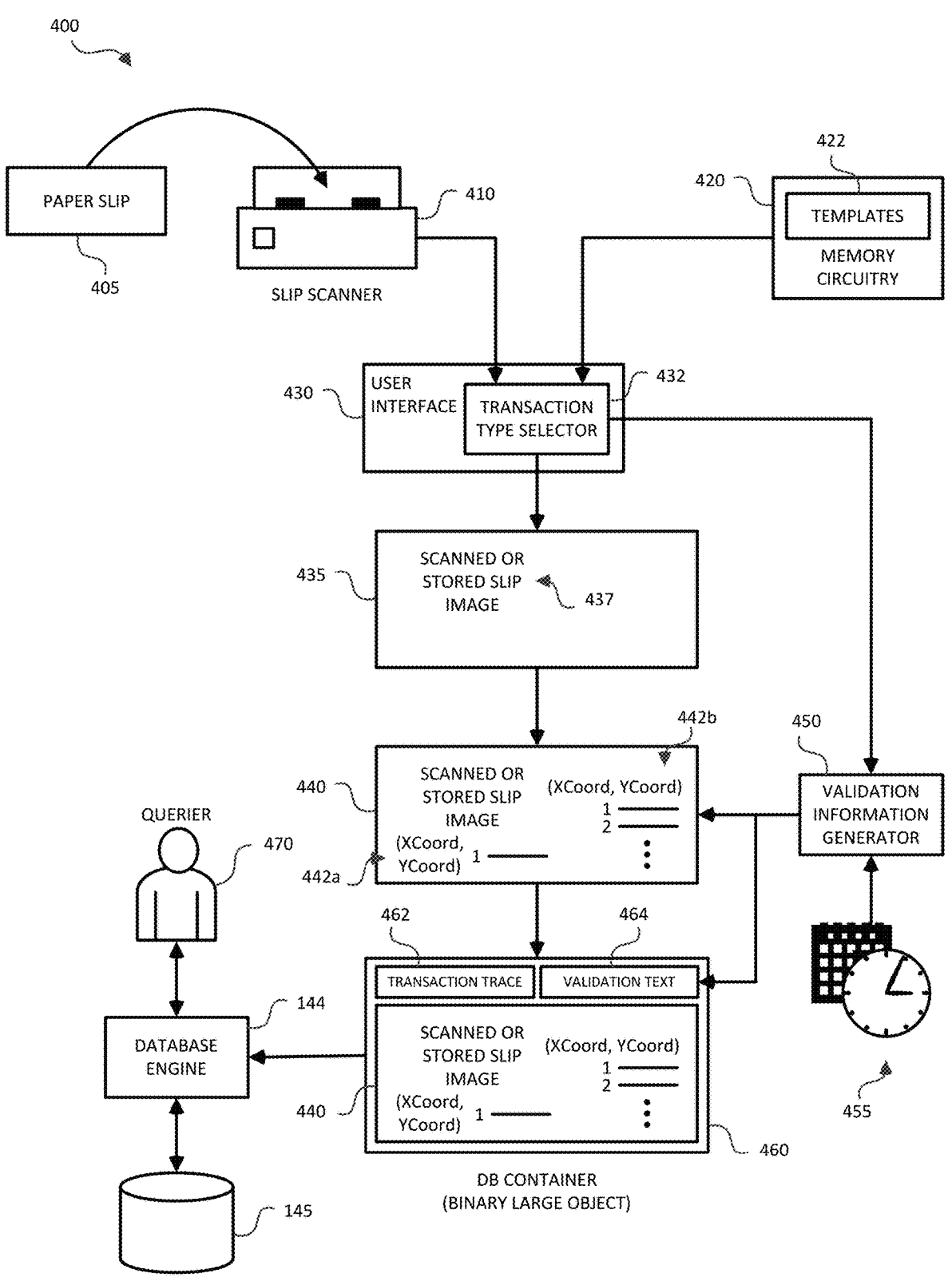
FIG. 4 is a graphical flow diagram of a transaction validation process according to the present disclosure.

FIG. 4 is a graphical flow diagram of a transaction validation process 400 according to the present disclosure. At user interface 430, a user such as a bank teller may identify a transaction type through a transaction type selector 432 implemented as a user control on user interface 430. The user may select a source for a transaction slip image, e.g., either from a slip scanner 410 having digitized a paper slip 405 or from a template 422 retrieved from memory 420. It certain embodiments, a template 422 may be retrieved for the selected transaction type even when the image itself of the transaction slip image has been scanned from a paper slip 405. The resulting transaction slip image 435 may be stored in memory, such as image memory 133, for further image processing operations. As illustrated in FIG. 4, transaction slip image 435 may include static graphic and/or text elements 437.

As illustrated in FIG. 4, template 422 may be provided to validation information generator 450, which may be constructed or otherwise configured to assemble and/or produce data 455, e.g., date and time data, transaction traces, etc., from one or more information sources for purposes of validating the transaction of the selected transaction type. Additionally, validation information generator 450 may associate pieces of data 455 with formatting specifications in template 422, such as those described with reference to FIG. 3. For example, one line of validation information profile 310 may be associated with a transaction ID, while another line thereof may be associated with a customer account number. Image processor 138 may accept these associations and render the validation information on transaction slip image 435 to construct validation slip image 440. As depicted in the figure at validation information items 442*a* and 442*b*, image processor 138 may distribute validation information across transaction slip image 435 according to line positioning data 330 of validation information data structure 300.

Validation slip image 440 is stored in database 145 in association with transaction information such as trace 462, validation text 464 and/or other information. In certain embodiments, validation slip image 440 may be included in a data structure or container 460 suitable for storage in database 145 along with other information, such as transaction trace 462 and validation text 464. In certain embodiments, data structure 460 may be implemented as a binary large object (BLOB), which, as used herein, is intended to refer to a collection of binary data stored as a single entity, e.g., an entry in database 144. However, it is to be understood that various database storage techniques may be utilized. A database engine 144 may be constructed or otherwise configured to both properly store BLOB 460 and to provide a mechanism by which a querier 470 may retrieve BLOB 460 from database 145 responsive to a database query therefor. In one example, querier 470 may be a slip proofer that retrieves BLOB 460 to inspect validation slip image 440 for errors in check processing in accordance with transaction validation process 400.

Figure 5:
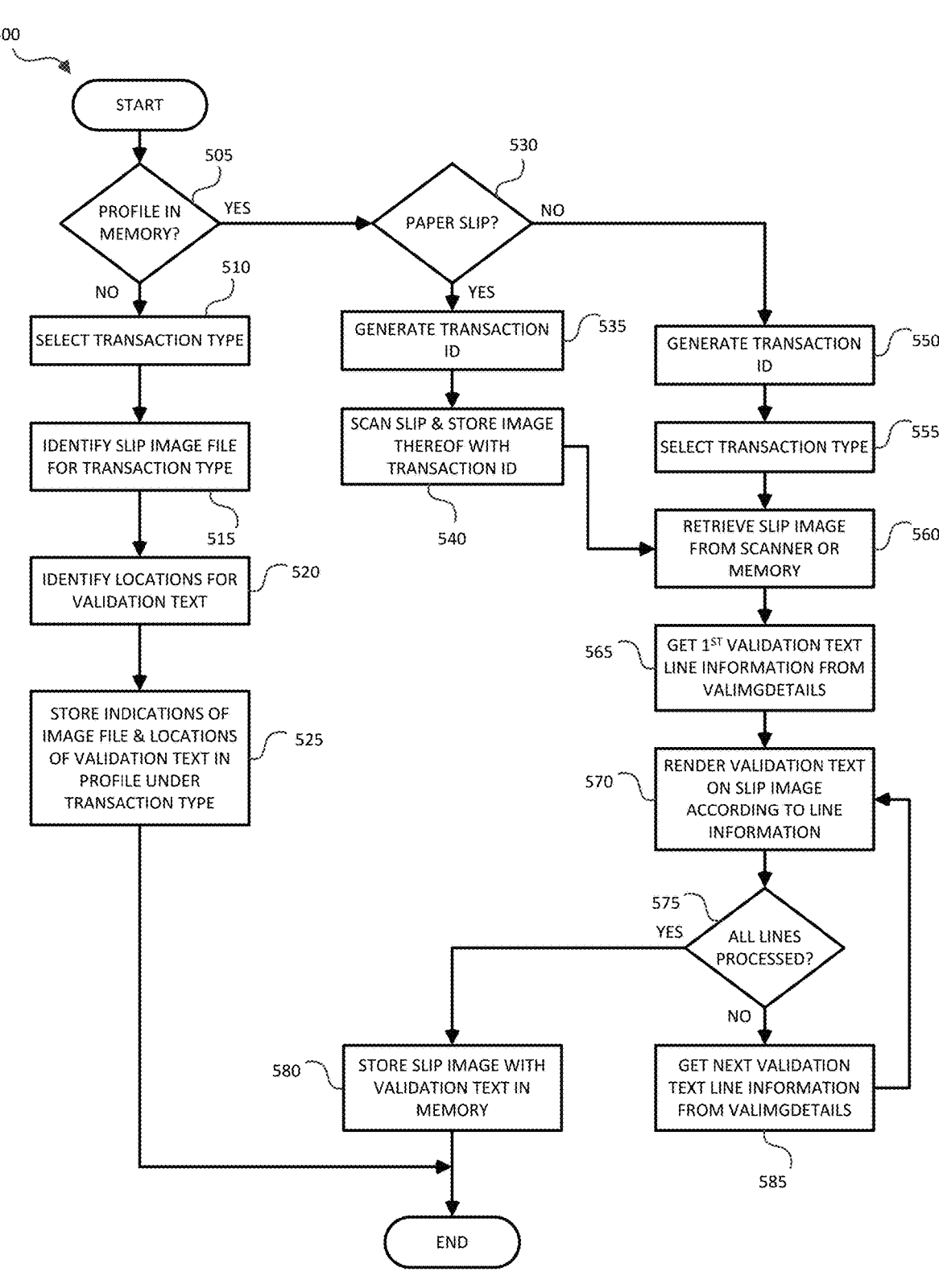
FIG. 5 is a flow diagram of a transaction validation process according to the present disclosure.

FIG. 5 is a flow diagram of a transaction validation process 500 according to the present disclosure. In an exemplary implementation, transaction validation process 500 is executed by processing circuitry 130 of transaction validation system 120. In other implementations, transaction validation process 500 is executed by processing circuitry of a user terminal such as user terminal 170, or by server 115. In yet other implementations, particular steps/operations may be performed by transaction validation system 120 at financial institution 100 while other particular steps/operations are performed by a remote device and/or at a remote location such as server 115.

Transaction validation process 500 begins with the processing circuitry 130 determining whether a profile for a transaction is stored in memory in operation 505. If it is determined that the profile is not stored in the memory, transaction validation process 500 may transition to operation 510 by which a user may select the transaction type for which the profile is being generated. In operation 515, the user may identify a slip image that is to be associated with the transaction type. In operation 520, the user may identify locations for the various pieces of validation text. In an exemplary implementation, operations 510-520 are performed via a user interface of the user terminal. In operation 525, the image file and locations of validation text are stored in the profile under the selected transaction type, such as by way of validation information data structure 300.

If the processing circuitry 130 determines in operation 505 that a profile already exists in memory for the transaction type, transaction validation process 500 may transition to operation to operation 530. At operation 530, the processing circuitry 130 determines whether a transaction involves a paper slip, such as a paper deposit slip as previously described. If the processing circuitry 130 determines at operation 530 that the transaction involves a paper slip, transaction validation process 500 may transition to operation 535, by which a transaction ID is generated. In operation 540, the paper slip is scanned, with slip scanner 166, and the image of the paper slip is stored in association with the generated transaction ID. Transaction validation process 500 then proceeds to operation 560.

If the processing circuitry 130 determines at operation 530 that the transaction does not involve a paper slip, transaction validation process 500 may transition to operation 550. At operation 550, a transaction ID is generated. In operation 555, a transaction type may be selected, such as by a bank teller. In an exemplary implementation, operation 555 may be performed via a user interface of the user terminal.

In operation 560, a transaction slip image is retrieved from slip scanner 166 or from a transaction slip image file stored in the profile for the transaction type. In certain embodiments, the transaction slip image is stored in a database in association with a transaction identifier and/or other transaction information, and the transaction slip image may be retrieved from the database at operation 560. In operation 565, first validation text line information may be retrieved from the profile. In an exemplary implementation, the first validation text line information is a validation string, which is a string of characters generated and corresponding to the slip image. In an exemplary implementation, the character string is dynamically generated. In operation 570, validation text associated with the first validation text line information may be rendered on the transaction slip image according to the first validation text line information. In an exemplary implementation, a validation string may be superimposed, stamped, added or recorded upon the transaction slip image to generate a modified slip image. In an exemplary implementation, operations 565-570 are performed by the processing circuitry 130.

In operation 575, the processing circuitry 130 determines whether all lines in the profile have been processed, e.g., rendered on the transaction slip image. If all of the lines have not been processed, then the next validation text line information is retrieved from the profile in operation 585 and transaction validation process returns to operation 570. If, however, all lines in the profile have been processed as determined in operation 575, then transaction validation process 500 may transition to operation 580, at which point the transaction slip image having the validation information rendered thereon may be stored as a validation slip image in memory in association with the transaction ID.

Certain embodiments of the present disclosure provide for the functional components to manufactured, transported, marketed and/or sold as processor instructions encoded on computer-readable media. Technologies of the present disclosure, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize aspects of the present disclosure as exemplified by the embodiments described above.

The descriptions above are intended to illustrate possible implementations of the present disclosure and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the present disclosure should therefore be determined not with reference to the description above, but with reference to the appended claims, along with their full range of equivalents.

The invention claimed is:

1. A financial transaction validation system, comprising:
a first device including:
    a scanner which scans a transaction slip of a transaction to generate a validation slip image;
    a cash processing machine which processes cash during the transaction, the cash being a physical medium;
    first processing circuitry configured to:
        receive transaction information relating to the transaction;
        receive the validation slip image corresponding to the transaction information;
        generate a validation string corresponding to the validation slip image;
        acquire validation information based on the cash processed during the transaction by the cash processing machine;
        in accordance with a selected template out of a plurality of templates stored in a memory, generate a modified slip image which is a rendering of the validation string and the validation information on the validation slip image, wherein
            each template comprises a validation information profile including font information and X and Y coordinates information regarding a location within the modified slip image, and
            the modified slip image is generated by rendering graphically, via a rendering engine the validation string and the validation information onto the validation slip image by modifying pixel values according to the font information and the X and Y coordinates information; and control a secure communication adapter to transfer automatically, to a database via a secure communication channel, the modified slip image in association with a transaction identifier corresponding to the transaction, wherein the transaction identifier indicates unique entity information and the database automatically stores the modified slip image in association with the transaction identifier; and a second device at a location different from a location of the first device, the second device including second processing circuitry configured to retrieve the modified slip image from the database in response to a query of the second device for validation by the second device.

2. The financial transaction validation system of claim 1, wherein the transaction slip is a deposit slip.

3. The financial transaction validation system of claim 1, wherein the first processing circuitry superimposes the validation string upon the validation slip image to generate the modified slip image.

4. The financial transaction validation system of claim 1, wherein the first processing circuitry is further configured to process the validation slip image to receive the transaction information.

5. The financial transaction validation system of claim 1, wherein the first processing circuitry is further configured to receive the transaction information via a user input.

6. The financial transaction validation system of claim 1, wherein the modified slip image is stored in the database in association with the transaction identifier and the transaction information.

7. The financial transaction validation system of claim 1, wherein the transaction identifier is dynamically assigned to the transaction associated with the modified slip image.

8. The financial transaction validation system of claim 1, wherein the validation string is the transaction identifier.

9. The financial transaction validation system of claim 1, wherein the transaction information indicates a transaction type of the transaction, and validation slip images stored in the database are identifiable according to a transaction type indicated by associated transaction information.

10. A user terminal, comprising:

a scanner which scans a transaction slip of a transaction to generate a validation slip image;

a cash processing machine which processes cash during the transaction, the cash being a physical medium;

first processing circuitry configured to:

receive transaction information relating to the transaction;

receive the validation slip image corresponding to the transaction information;

generate a validation string corresponding to the validation slip image;

acquire validation information based on the cash processed during the transaction by the cash processing machine;

in accordance with a selected template out of a plurality of templates stored in a memory, generate a modified slip image which is a rendering of the validation string and the validation information on the validation slip image, wherein each template comprises a validation information profile including font information and X and Y coordinates information regarding a location within the modified slip image, and the modified slip image is generated by rendering graphically, via a rendering engine, the validation string and the validation information onto the validation slip image by modifying pixel values according to the font information and the X and Y coordinates information; and control a secure communication adapter to transmit automatically, to a database via a secure communication channel, the modified slip image in association with a transaction identifier corresponding to the transaction, wherein the transaction identifier indicates unique entity information, the database automatically stores the modified slip image in association with the transaction identifier, and second processing circuitry, of a second device at a location different from a location of the user terminal, is configured to retrieve the modified slip image from the database in response to a query of the second device for validation by the second device.

11. The user terminal of claim 10, wherein the first processing circuitry is further configured to display, via a display, the validation slip image; and receive profile configuration information from a user via a user interface.

12. The user terminal of claim 11, wherein the first processing circuitry generates the modified slip image according to the profile configuration information.

13. The user terminal of claim 11, wherein the first processing circuitry is further configured to display the modified slip image via the display.

14. The user terminal of claim 11, wherein the transaction slip is a deposit slip.

15. A method of validating a financial transaction, the method comprising:

scanning, by a scanner, a transaction slip of a transaction to generate a validation slip image;

processing, by a cash processing machine, cash during the transaction, the cash being a physical medium;

receiving, by first processing circuitry of a first device, transaction information relating to the transaction;

receiving, by the first processing circuitry, the validation slip image corresponding to the transaction information;

generating a validation string corresponding to the validation slip image;

acquiring validation information based on the cash processed during the transaction by the cash processing machine;

generating, by the first processing circuitry in accordance with a selected template out of a plurality of templates stored in a memory, a modified slip image which is a rendering of the validation string and the validation information on the validation slip image, wherein each template comprises a validation information profile including font information and X and Y coordinates information regarding a location within the modified slip image, and the modified slip image is generated by rendering graphically, via a rendering engine, the validation string and the validation information onto the validation slip image by modifying pixel values according to the font information and the X and Y coordinates information;

controlling, by the first processing circuitry, a secure communication adapter to transfer automatically, to a database via a secure communication channel, the modified slip image in association with a transaction identifier corresponding to the transaction, wherein the transaction identifier indicates unique entity information and the database automatically stores the modified slip image in association with the transaction identifier; and retrieving, by second processing circuitry of a second device at a location different from a location of the first device, the modified slip image from the database in response to a query of the second device for validation by the second device.

16. The method of claim 15, wherein the modified slip image is stored, in the database, in association with the transaction identifier and the transaction information.

17. The method of claim 15, wherein the transaction identifier is dynamically assigned to the transaction associated with the modified slip image.

* * * * *